(12) United States Patent
Feltz et al.

(10) Patent No.: US 7,439,861 B2
(45) Date of Patent: *Oct. 21, 2008

(54) RFID PRINTER AND ANTENNAS

(75) Inventors: John F. Feltz, Fairborn, OH (US); Jim A. McCurdy, Liberty Township, OH (US); Lance D. Neuhard, New Carlisle, OH (US)

(73) Assignee: Paxar Americas, Inc., Miamisburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/789,109

(22) Filed: Apr. 23, 2007

(65) Prior Publication Data

US 2007/0200710 A1    Aug. 30, 2007

Related U.S. Application Data

(63) Continuation of application No. 10/873,979, filed on Jun. 22, 2004.

(51) Int. Cl.
*G08B 13/14* (2006.01)
(52) U.S. Cl. ..................................... 340/572.1; 235/432
(58) Field of Classification Search ............. 340/572.1, 340/572.7, 572.8; 235/432
See application file for complete search history.

(56) References Cited

U.S. PATENT DOCUMENTS

| 5,081,458 | A | 1/1992 | Meunier |
| 5,833,377 | A | 11/1998 | Keller |
| 5,850,187 | A | 12/1998 | Carrender et al. |
| 6,104,291 | A | 8/2000 | Beauvillier et al. |
| 6,327,972 | B2 | 12/2001 | Heredia et al. |
| 6,409,401 | B1 | 6/2002 | Petteruti |
| 6,481,907 | B2 | 11/2002 | Banach |
| 6,677,852 | B1 | 1/2004 | Landt |
| 6,848,616 | B2 | 2/2005 | Tsirline |
| 6,899,476 | B1 | 5/2005 | Barrus et al. |
| 6,922,173 | B2 | 7/2005 | Anderson |
| 6,943,678 | B2 | 9/2005 | Murhead |
| 2001/0029857 | A1 | 10/2001 | Heredia et al. |
| 2004/0032443 | A1 | 2/2004 | Moylan |
| 2004/0178267 | A1 | 9/2004 | Tsirline |

OTHER PUBLICATIONS

U.S. Appl. No. 10/660,856, Chau.

*Primary Examiner*—John A Tweel, Jr.
(74) *Attorney, Agent, or Firm*—Joseph J. Grass

(57) ABSTRACT

A shielded antenna system is provided for reading from and/or writing to an RFID transponder wherein the energy radiated from the antenna system has a narrow beam width so that only one RFID transponder in a record member along a web of record members, each having an RFID transponder, is read from and/or written to without affecting or being affected by any other RFID transponder along the web.

11 Claims, 15 Drawing Sheets

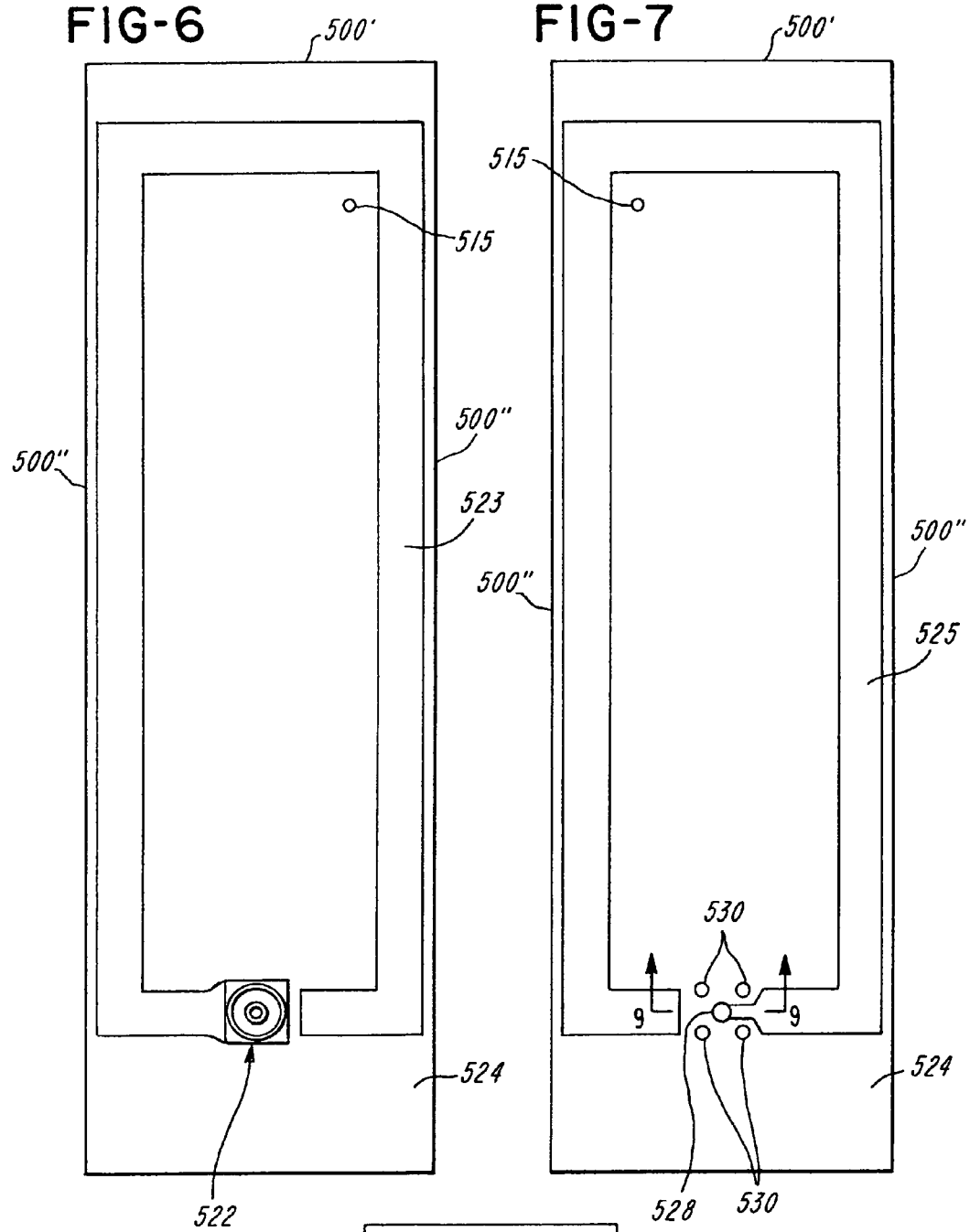

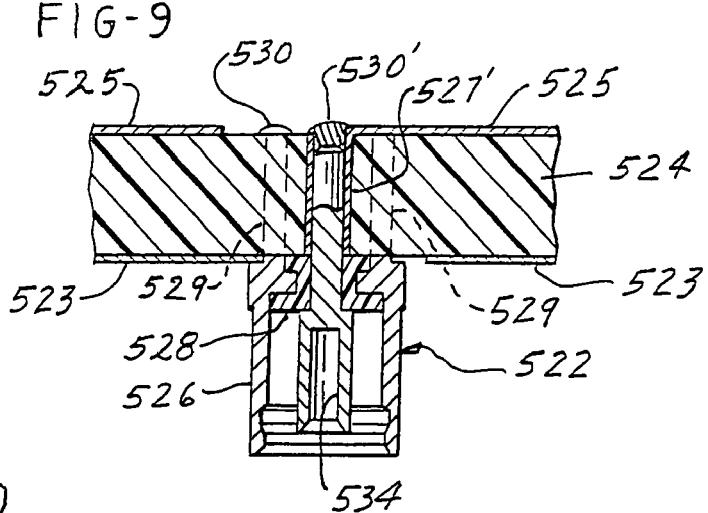
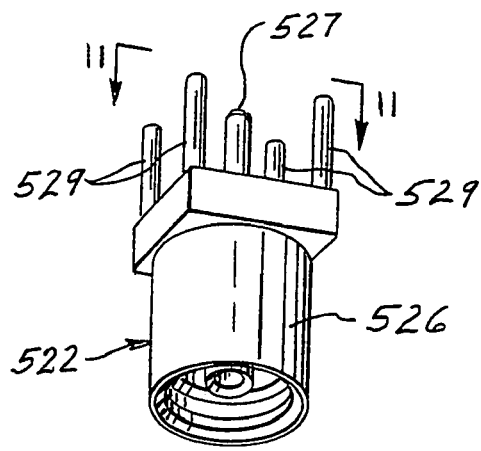
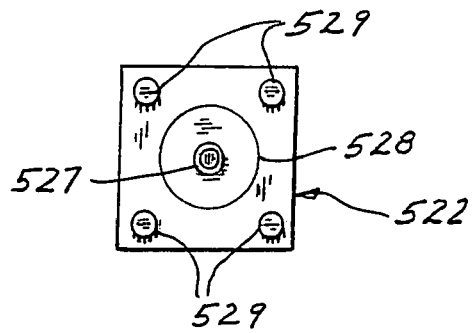
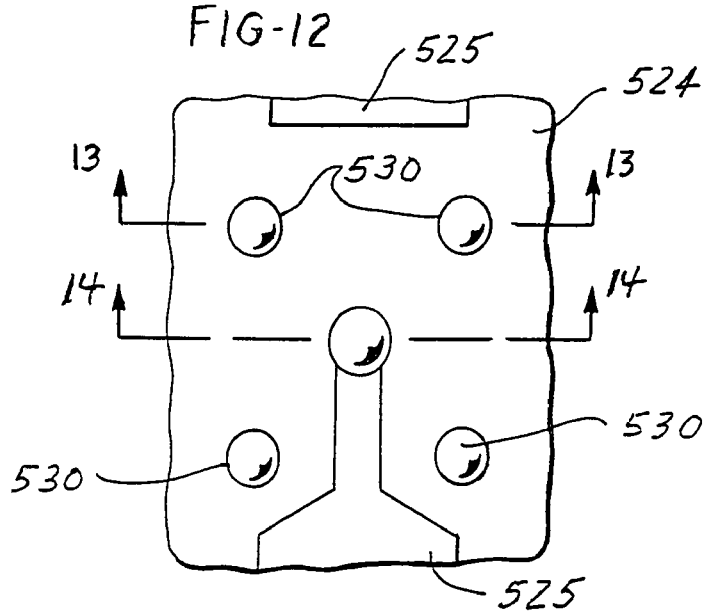

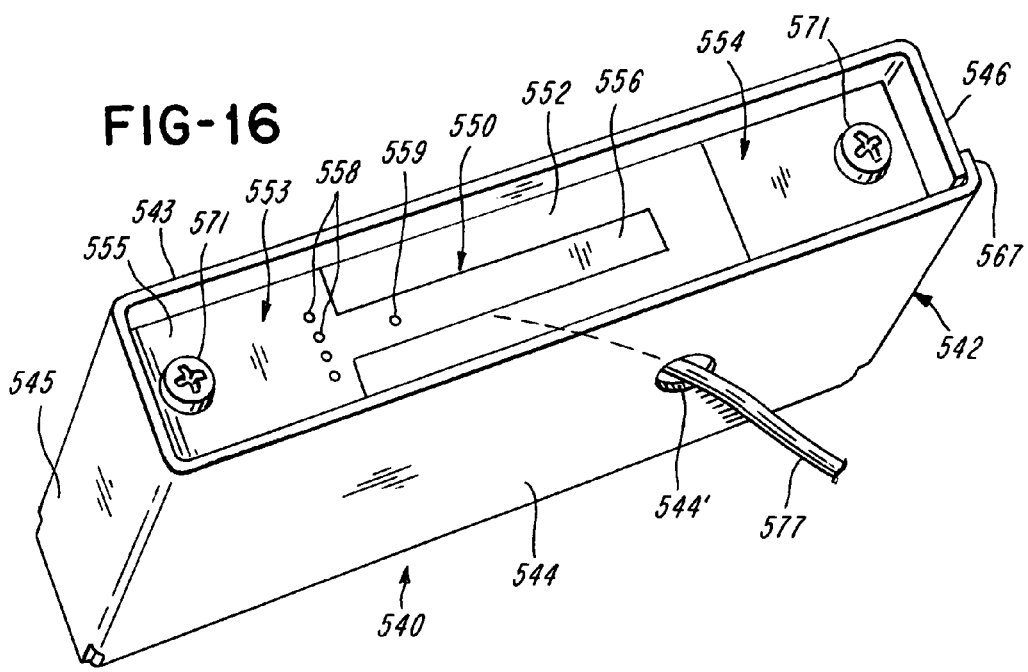
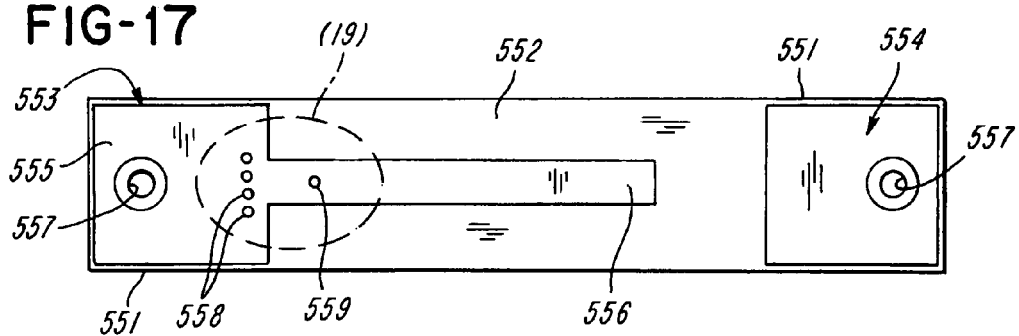
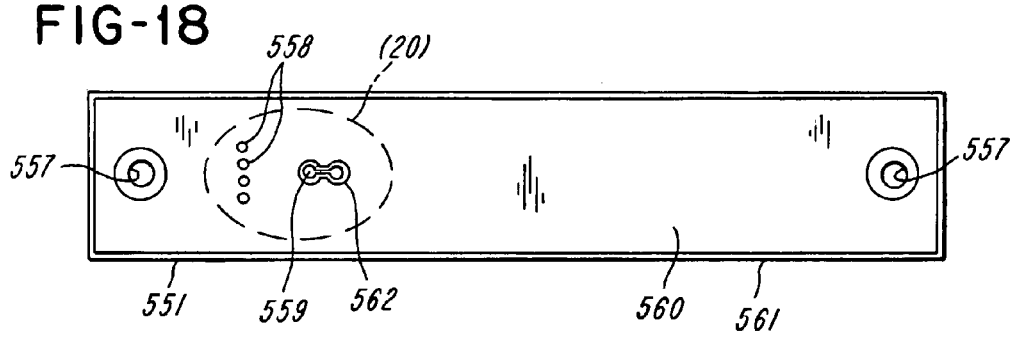

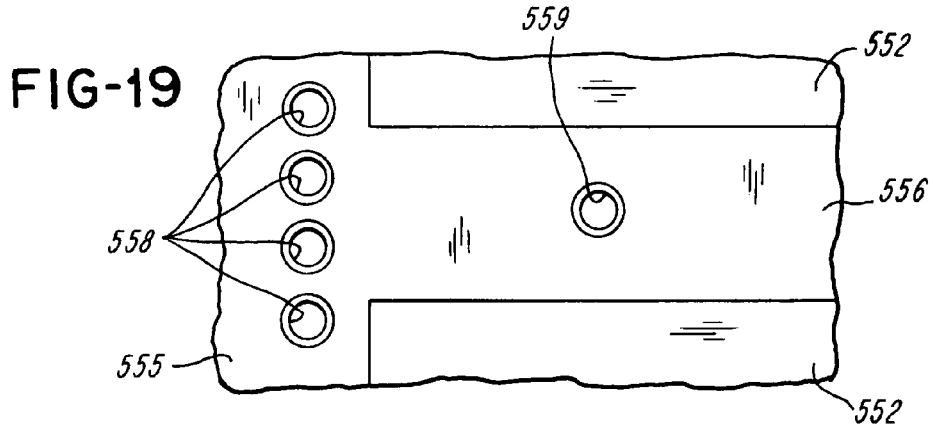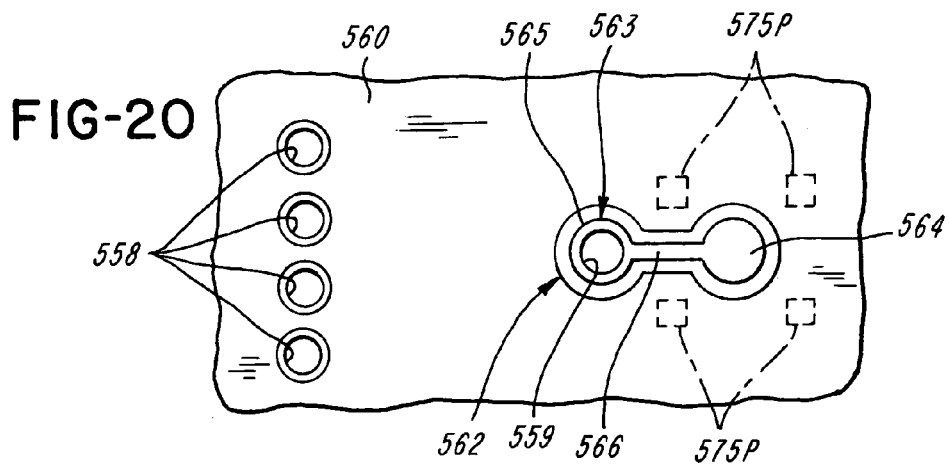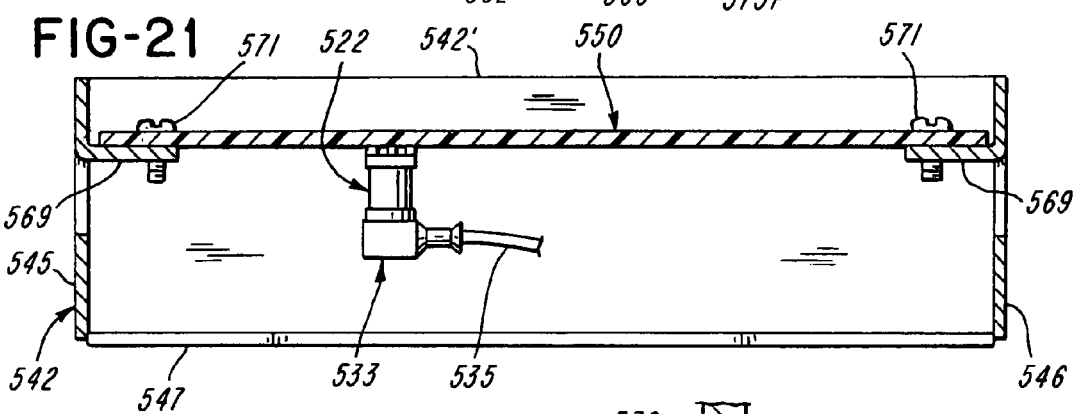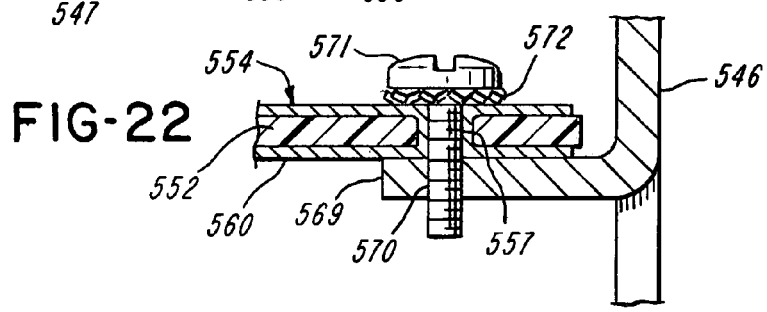

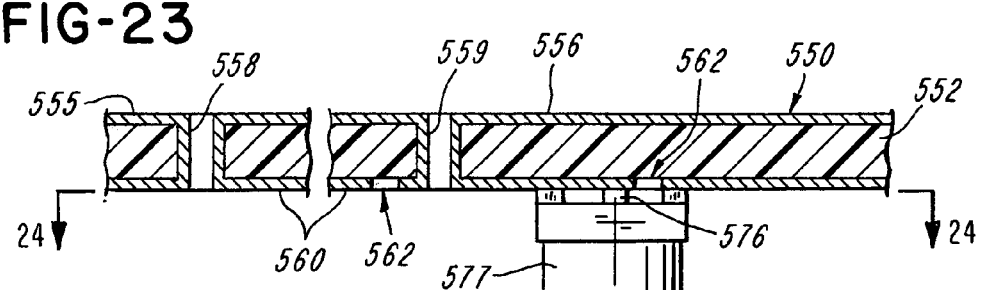
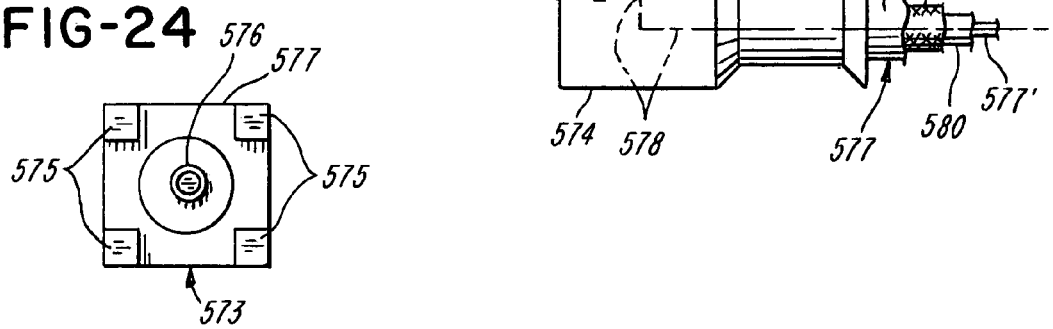
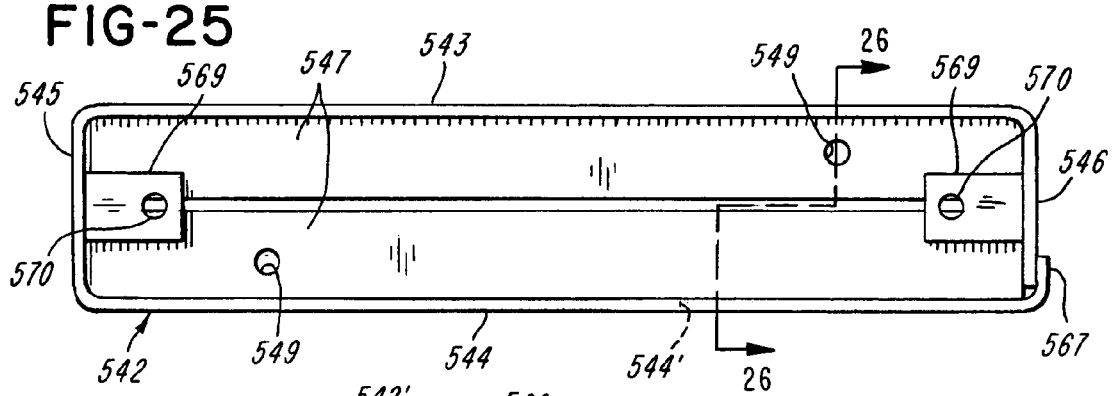
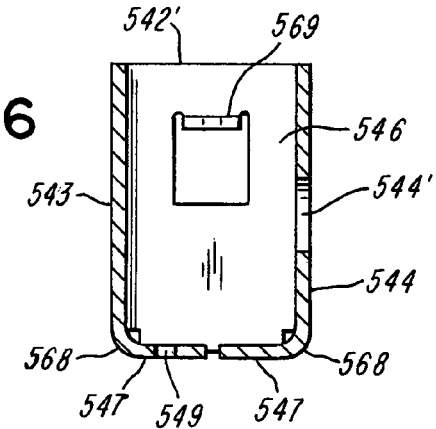

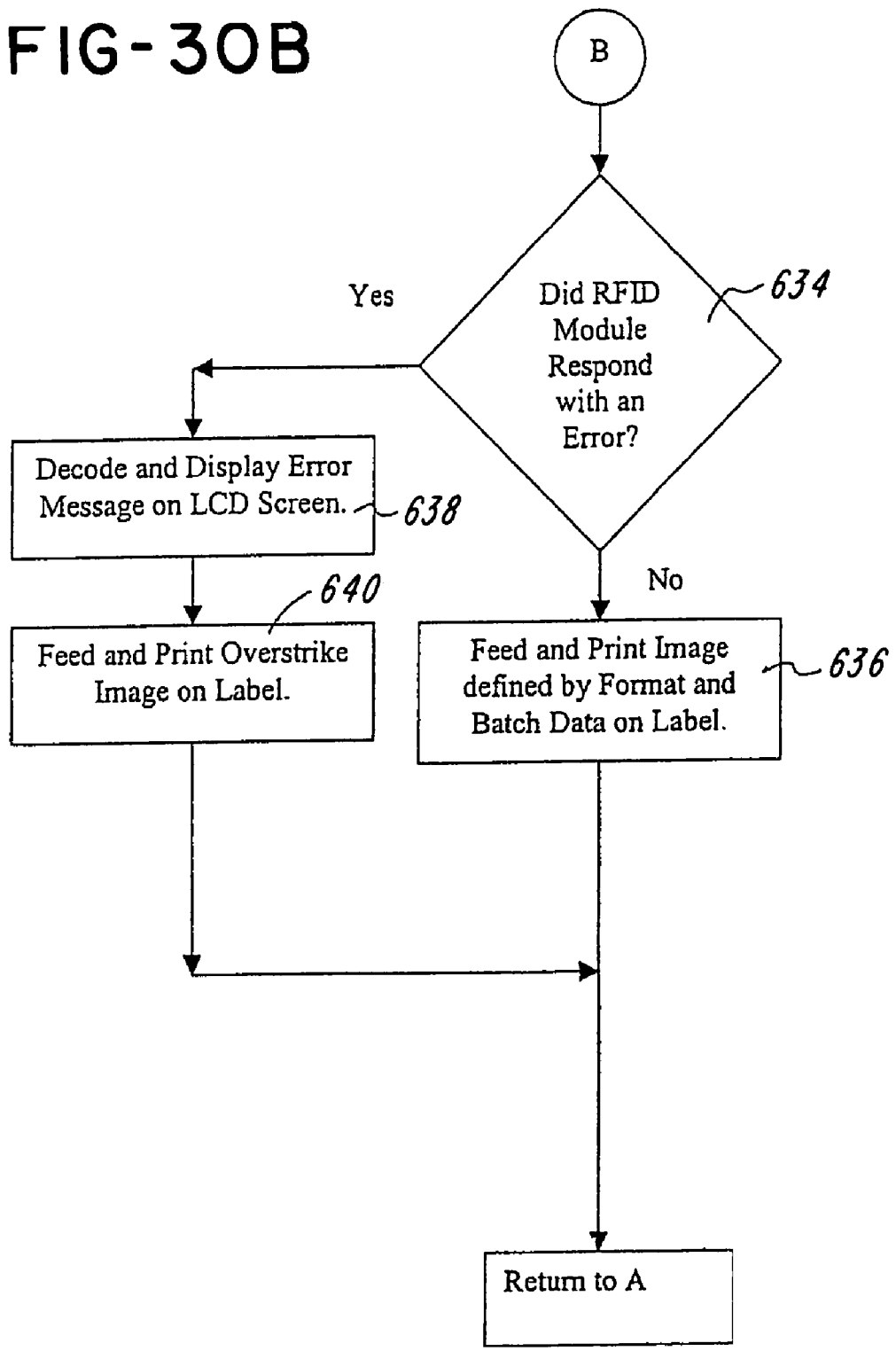

RFID PRINTER AND ANTENNAS

CROSS-REFERENCE TO RELATED APPLICATION

This application is a continuation of pending application Ser. No. 10/873,979, filed Jun. 22, 2004.

BACKGROUND OF THE INVENTION

1. Field of the Invention

This invention relates to RFID (Radio Frequency Identification) printers and antennas.

2. Brief Description of the Prior Art

The following prior art is made of Record: U.S. Pat. Nos. 5,833,377; 6,327,972; 6,481,907; 6,677,852; and U.S. patent application Ser. No. 10/222,692 filed Aug. 16, 2002, Publication No. 2004/0032443 published Feb. 19, 2004.

RFID printers are now required to be capable of both printing on record members, such as labels, tags, etc., and capable of writing to and/or reading from an RFID transponder contained on the record member. One requirement is that certain record members e.g., compliance labels contain transponders. Such compliance labels are frequently six inches in length. Therefore, the transponders are to be located on the record members at a distance of six inches apart along the length of the web of record members. Placing the transponders in the web six inches apart may prevent the reprogramming of an RFID transponder upstream and/or downstream of the RFID read/write station of the printer.

It has been proposed to use a whip antenna to write to and/or read RFID transponders in RFID printers.

SUMMARY OF THE INVENTION

In accordance with the present invention, various disadvantages of prior art RFID printers and the antenna systems used therein have been overcome. The RFID printer of the present invention includes an antenna system that is discriminating enough so that RFID transponders at closely spaced locations along a web of printable record members can be read from and/or written to at a read and/or write station on a one-by-one basis without being affected by or affecting an RFID transponder in an adjacent record member.

In accordance with the present invention an improved shielded antenna system is provided for reading and/or writing to an RFID transponder wherein the energy radiated from the antenna system has a narrow beam width so that only one RFID transponder in a record member along a web of record members, each having an RFID transponder, is read and/or written to without affecting or being affected by any other RFID transponder along the web.

In one embodiment of the present invention, the antenna assembly includes a loop antenna having a substrate, a conductor formed on the substrate in a loop pattern and a non-conducting mounting bracket substantially surrounding three sides of the antenna substrate wherein the antenna assembly is supported on a shield, and the shield blocks energy radiating from the antenna from an RFID transponder downstream of the shield.

In another embodiment of the present invention, an antenna assembly includes an antenna that radiates energy to write to and/or read an RFID transponder. The antenna assembly also includes a conductive enclosure with at least one opening, the antenna being supported in the enclosure such that the energy radiated from the substantially enclosed antenna is sufficient to write to and/or read an RFID transponder in a record member generally aligned with the opening of the enclosure, but wherein the enclosure blocks a portion of the radiated energy from a record member adjacent to the aligned record member.

In accordance with another feature of the present invention, the antenna assembly is supported on a shield. The shield has a portion that extends towards the web so that at least a part of the shield is adjacent to the web in order to shield an RFID transponder in a record member downstream of the shield from energy radiated from the antenna.

It is a feature of the invention to provide an improved antenna which can write to and/or read one transponder at a time in a web of transponders without writing to, rewriting or reading adjacent transponders, wherein the transponders can be spaced two inches or less apart and more particularly as close as about one inch apart.

It is a feature of the invention to provide improved antennas having a narrow beam and a broad band width in a small space.

These and other advantages and novel features of the present invention, as well as details of the illustrated embodiments thereof, will be more fully understood from the following description and drawings.

BRIEF DESCRIPTION OF THE DIAGRAMMATIC DRAWINGS

FIG. 6 is an enlarged connector side view of the antenna assembly shown in FIGS. 3 and 5;

FIG. 7 is an enlarged opposite side view of the antenna assembly shown in FIGS. 3, 5 and 6;

FIG. 8 is a diagrammatic view of the antenna circuit shown in FIGS. 3 and 5 through 7;

FIG. 9 is a sectional view taken generally along line 9-9 of FIG. 7;

FIG. 10 is a perspective view of a jack of a connector also shown in FIG. 9;

FIG. 11 is a top plan taken in the direction of arrows 11-11 in FIG. 10;

FIG. 12 is an enlarged fragmentary view of the opposite side of the antenna assembly as seen in FIG. 7;

FIG. 16 is a perspective view of the antenna assembly depicted in FIG. 15;

FIG. 17 is a top plan view of the antenna of the antenna assembly depicted in FIGS. 15 and 16;

FIG. 18 is a bottom view showing the ground plane of the antenna depicted in FIGS. 15 through 17;

FIG. 19 is an enlarged view of the encircled portion (19) of the antenna shown in FIG. 17;

FIG. 20 is an enlarged view of the encircled portion (20) of the antenna shown in FIG. 18;

FIG. 21 is a sectional view of the antenna assembly shown in FIGS. 15 and 16;

FIG. 22 is a fragmentary sectional view showing the manner the antenna is mounted to a shielding enclosure or shield;

FIG. 23 is an enlarged fragmentary sectional view showing a connector for connecting a shielded conductor to the antenna of FIG. 21;

FIG. 24 is a fragmentary top plan view showing only the upper portion of the connector taken along line 24-24 of FIG. 23;

FIG. 25 is a top plan view of the shielding enclosure;

FIG. 26 is a sectional view taken along line 26-26 of FIG. 25;

FIGS. 30A and 30B form a flowchart illustrating an RFID read/write operation and a print operation of the RFID printer of the present invention.

DETAILED DESCRIPTION OF THE INVENTION

Figure 1:
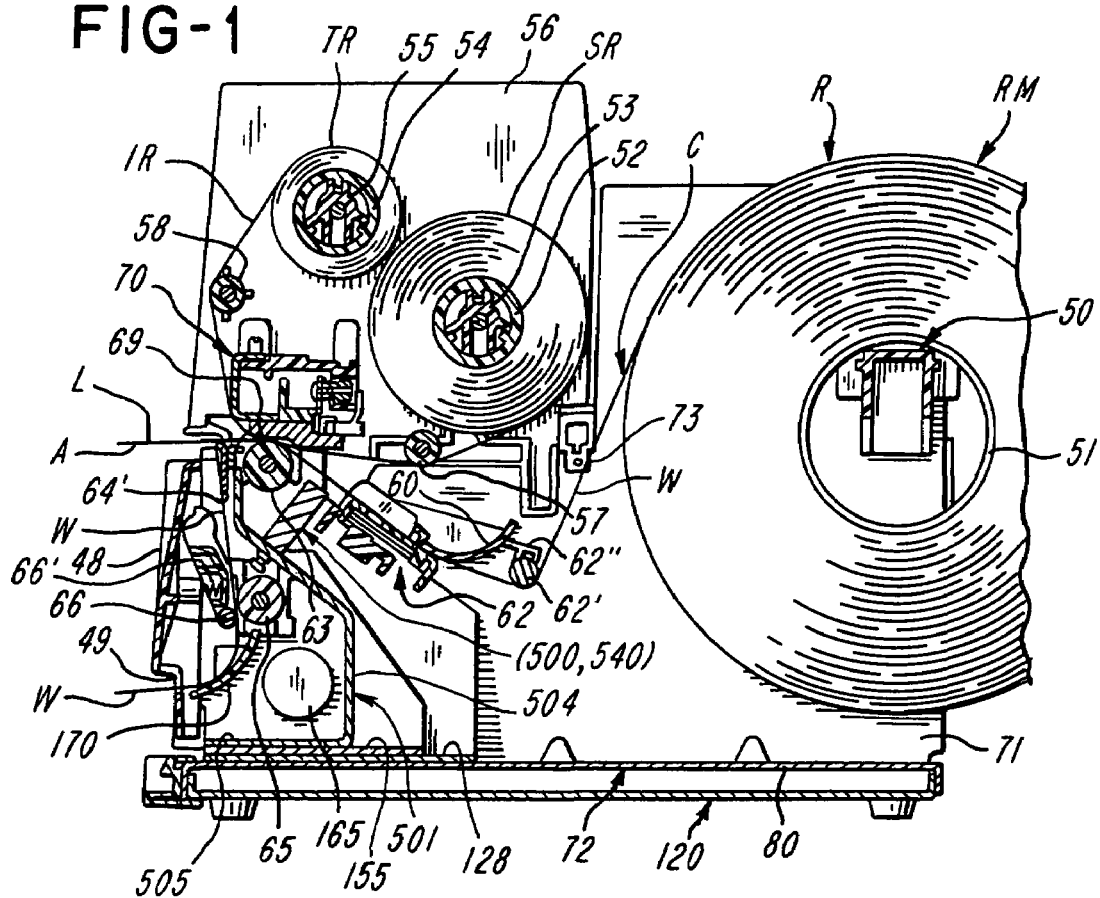
FIG. 1 is a sectional view of an RFID printer.

With reference initially to FIG. 1, there is shown a printer generally indicated at 40 which is essentially the same as the printer 40 disclosed in U.S. Pat. No. 5,833,377, the disclosure of which is incorporated herein by reference, except as otherwise disclosed herein. For components in this application which correspond to components in U.S. Pat. No. 5,833,377 the same reference characters are used.

While the invention is illustrated in connection with a thermal printer using dot heating elements to create images such as bar codes, graphics, alpha numeric characters and the like, the invention is also useful with printers such as ink jet, laser, xerographic, impact, and other types of printers.

Figure 2:
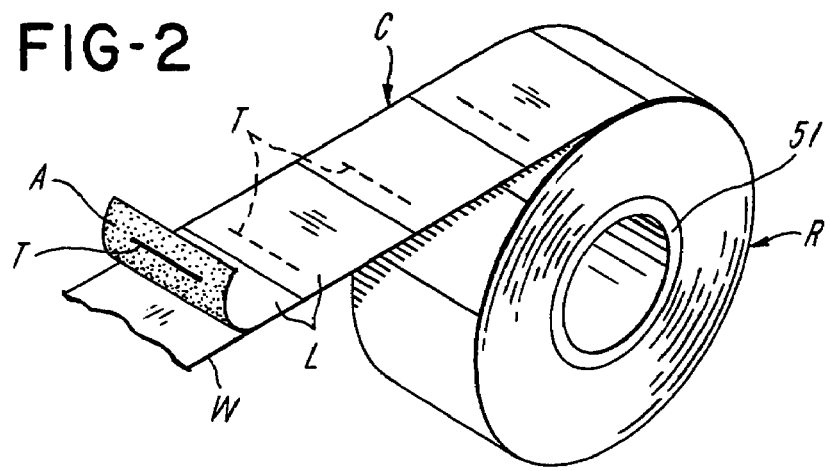
FIG. 2 is a perspective view of a roll of a web of labels containing RFID transponders.
Figure 3:
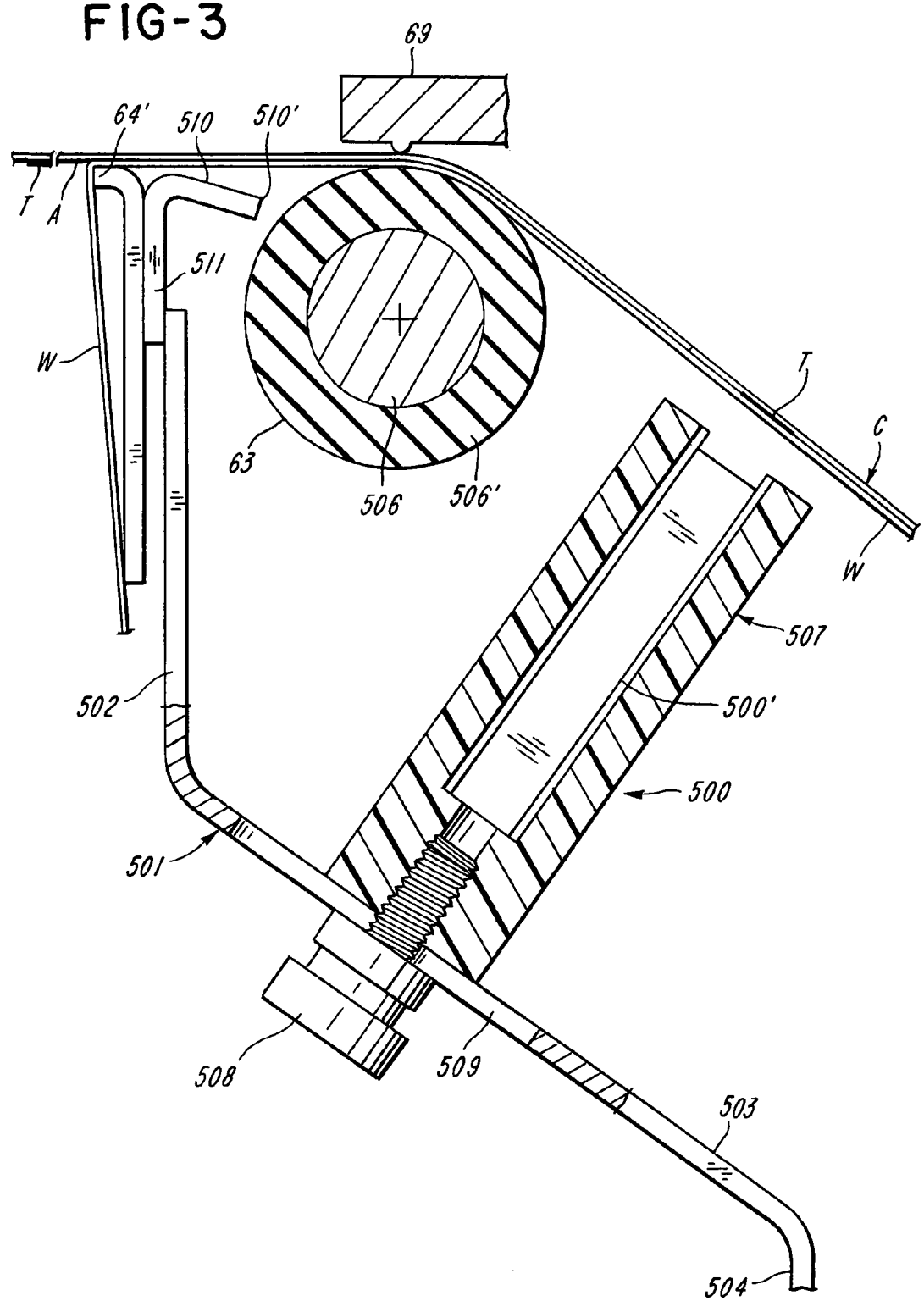
FIG. 3 is an enlarged sectional view showing components of the printer including an antenna system used to write to and/or read an RFID transponder in a label of a web of labels.

The printer 40 has a generally vertical frame panel 71 and a conductive metal horizontal frame member 72 on a conductive metal base plate 120. A movable mounting member 56 is pivotally mounted to the frame plate 71 about hinge blocks 73 (only one of which is shown in FIG. 1). A roll mounting member 50 is shown to mount a roll R of a web C of record members RM. The record members RM are illustrated to comprise a composite label web C which comprises a carrier web W to which a series of pressure sensitive labels L are releasably adhered by pressure sensitive, tacky, adhesive A (FIG. 2). If desired, the web of record members RM can be comprised of a web of tags or forms. The web C is shown to be paid out of the roll R and passes beneath a guide roller 62' rotatably mounted by a bracket 62" to a guide member 60 which is part of a web guide generally indicated at 62. Any suitable web guide, for example, just a member with a curved surface or a roller can be used instead, if desired. From there the web C passes between a thermal print head 69 which is part of a print head assembly 70 and a platen roll 63. It is noted the web C extends from the roll R to a position upstream of the nip of the print head 69 and the platen roll 63 and extends downstream beyond the nip. The platen roll 63 is shown to have a conductive metal shaft 506 about which a tubular elastomeric sleeve 506' is received as shown in FIG. 3 for example. The shaft 506 acts as an RF reflector. If desired the shaft 506 can be made of a rigid plastics material which is not RF reflective. A delaminator in the form of a peel bar 64' is provided downstream and preferably adjacent the nip. However, the delaminator can alternatively comprise a peel roller. A label L can be delaminated at the delaminator 64' when the web W is advanced by a motor 165 between a motor-driven roll 65 and a back-up roll 66. A spring 66' is used to urge the backup roll 66 toward the roll 65 so that the web W is pressed between the rolls 65 and 66. From there the carrier web W passes about an arcuate guide plate 170 and through an exit opening 49 of a movable panel 48.

The illustrated printer 40 utilizes an ink ribbon IR wound into a supply roll SR. The supply roll SR has a core 52 and the core 52 is mounted on a spindle 53. The ink ribbon IR is paid out of the supply roll SR and passes beneath a ribbon guide 57 to the nip between the print head 69 and the platen roll 63 and from there the ink ribbon IR passes partially about a guide 58 and onto a take-up roll TR. The take-up roll TR has a core 54 identical to the core 52. The core 54 is mounted on a spindle 55 identical to the spindle 53. Except for the delaminator 64', the roll 62' and the bracket 62" the foregoing describes the printer 40 disclosed in U.S. Pat. No. 5,833,377.

With continued reference to FIG. 1, unlike the record members RM in U.S. Pat. No. 5,833,377, each of the record members R include an RFID transponder T incorporated in a composite web C of labels L as best shown in FIG. 2. A typical transponder includes an integrated circuit chip and an antenna. As shown in FIG. 2, the roll R includes RFID labels L. Each label L is illustrated to have an RFID transponder T adhered to the adhesive A on the underside of the label L. Thus, the composite label web C has an RFID transponder T sandwiched between the label L and the carrier web W. The RFID transponder T in a preferred embodiment is a passive transponder that uses received RF energy to power the chip of the transponder T and enabling functions of reading and/or writing when sufficient energy is received by the transponder T so that information can be read or written to, i.e., programmed into, the RFID transponder. The pitch of the transponders T is considered the distance from the centerline of one transponder to the centerline of an immediately adjacent transponder. The pitch or length of a record member RM is the distance from the leading edge of one record member RM to the leading of an adjacent record member RM in the longitudinal direction of the web.

FIG. 1 also shows an antenna assembly 500 fitted between the web guide 62 and the platen roll 63. A shield or RF reflector generally indicated at 501 extends into contact with an electrically conductive metal delaminator in the form of a peel edge 64' which forms part of the shield. The shield 501, which is preferably comprised of conductive metal such as steel, has an inclined portion 503 (FIG. 3), a downwardly extending portion 502 joined to the inclined portion 503, a downwardly extending portion 504 and a base portion 505 grounded to the frame 120. The motor 165 is below the inclined portion and above the base portion 505. The platen roll 63 is above the inclined portion 503. The inclined portion 503 of the shield 501, in one preferred embodiment, supports the antenna assembly 500 so that a plane of antenna 500' is perpendicular to an RFID transponder T adjacent the antenna 500'. The second portion 502 of the shield 501 extends at an angle from the support portion 503 and towards the web C so that a part of the shield 501 is adjacent the web C to shield an RFID transponder in an adjacent record member RM that is downstream of the shield 501, i.e., a record member RM that is past the shield 501 in the direction of web movement, from energy radiated from the antenna 500'. The second portion 502 of the shield 501 is formed integrally with the portion 503 supporting the antenna 500'. Alternatively, the second shield portion 502 may include multiple parts. For example, as best shown in FIG. 3, the portion of the shield 501 adjacent to the web includes an electrically conductive metal web guide 510 with a downwardly extending portion 511 that abuts and makes intimate electrical contact with shield portion 502. The portion of the shield 501 adjacent the web C may also include the delaminator 64' as discussed below.

With reference to FIG. 3, the platen roll 63 is shown to have a conductive steel shaft 506 which reflects radiation from the antenna assembly 500. The antenna assembly 500 includes a non-conducting bracket or holder 507 which is secured to the shield portion 503 by two thumb screws 508 (only one of which is shown) threaded into the holder 507. The screws 508 pass through laterally spaced elongate slots 509 in the inclined shield portion 503. The slots 509 allow the position of the antenna assembly 500 to be adjusted. The slope of the inclined shield portion 503 is parallel to the path of the web C at the read and/or write station where a transponder T is read and/or written to. Movement of the antenna assembly 500 allows optimal alignment of the antenna 500' with RFID transponders T on the composite web C. The delaminator 64' and the guide form part of the shield 501.

The shelf or web guide 510 has a downwardly extending portion 511 which is welded to the delaminator 64'. The delaminator 64' and the guide 510 are preferably composed of steel. The shield 501, the delaminator 64' and the guide 510, provide effective shielding of the energy radiated from the antenna assembly 500 and from an RFID transponder which is downstream of the shield 501, the guide 510 and the delaminator 64'. As shown in FIG. 3, one of the RFID transponders T is spaced from but is adjacent to the antenna assembly 500. Therefore, the antenna 500' does not affect the RFID transponder T which is beyond the delaminator 64'. FIG. 3 shows the antenna assembly 500 to be located at a write and/or read station.

Figure 4:
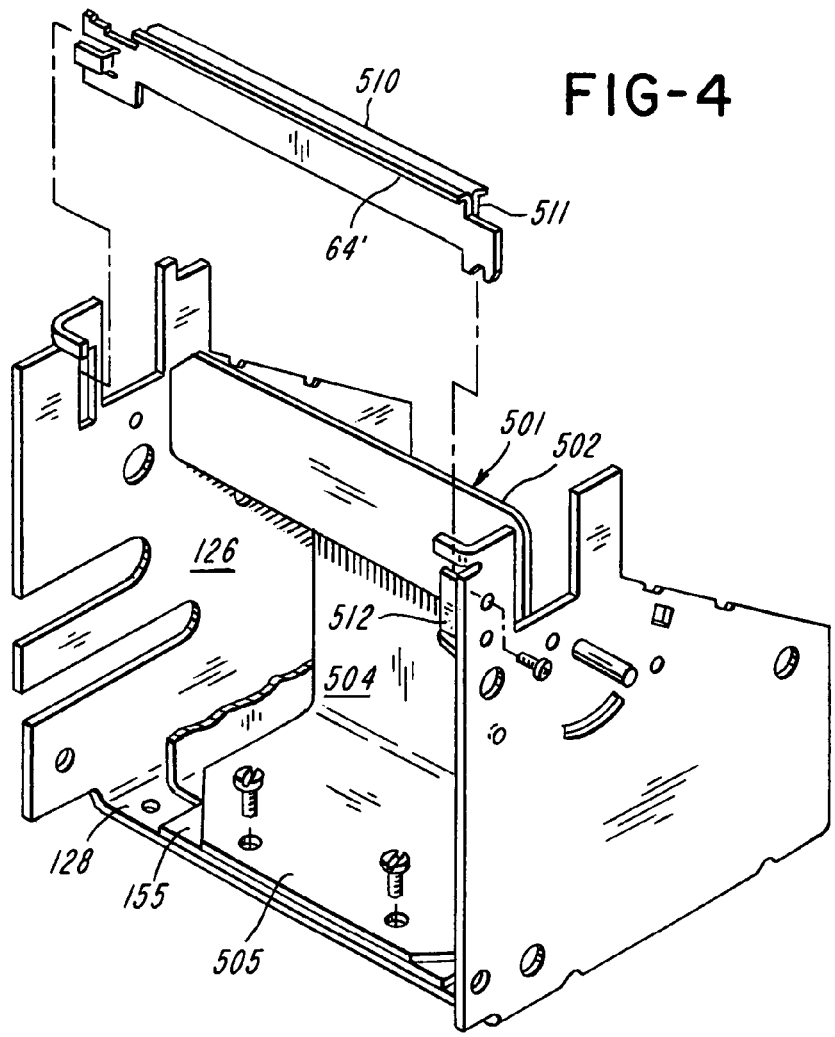
FIG. 4 is a partially exploded perspective view of a printer frame, shielding and peel structures.

With reference to FIG. 4, there is shown the delaminator 64' which hooks into wall 126 and snaps into a connector 512 screwed to wall 126. A bight portion 155 is sandwiched between the base portion 505 and a bight portion 128. The portions 128, 155 and 505 are screwed to panel 80 (FIG. 1). Thus, the shield is conductively connected to the printer frame. Connecting the delaminator 64' in the same manner as in U.S. Pat. No. 5,833,377 with screws instead of a snap connector is also a preferred construction.

Figure 5:
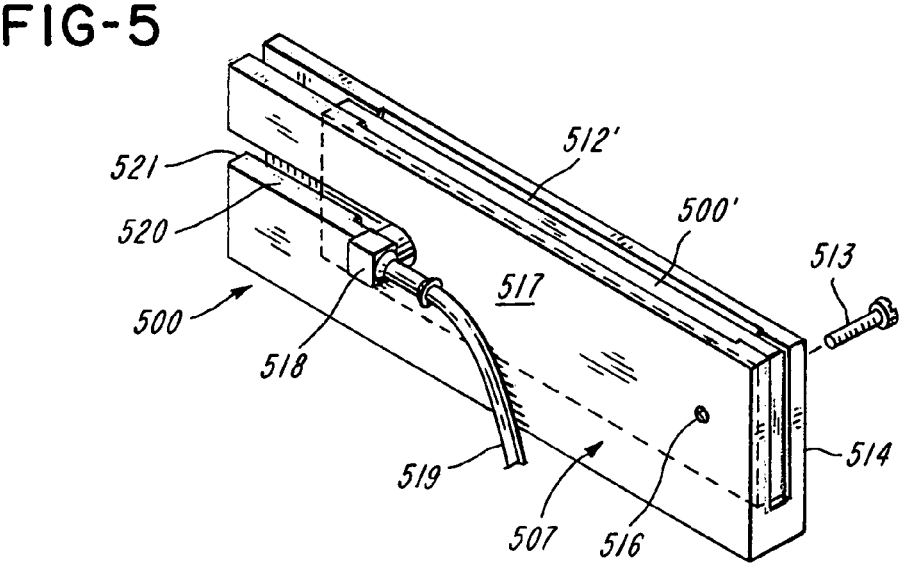
FIG. 5 is a perspective partly sectional view of one embodiment of an antenna assembly also shown in FIG. 3.

With reference to FIG. 5, the antenna assembly 500 includes antenna 500' received in a slot 512 in the generally U-shaped non-conducting bracket or holder 507. The antenna 500' is held in position in the holder 507 by a screw 513 which passes through a hole (not shown) in one arm 514, through a hole 515 (FIGS. 6 and 7) in the antenna 500' and is threadably received in a hole 516 in another arm 517 of the holder 507. The antenna 500' is connected via a connector 518 to a shielded conductor 519. The arm 517 has an open-ended slot 520 which enables the antenna 500' to be slid into the slot 520 from end 521. The holder 507 is preferably constructed of a non-conductive plastics material preferably polypropylene.

With reference to FIGS. 5, 6 and 7 there is shown the antenna 500'. There is also shown a jack 522 forming part of the connector 518 which is connected to the antenna 500'. The antenna 500' includes loop antenna conductors 523 and 525 connected to the jack 522, and a non-conductive printed circuit board substrate 524 on which the conductors 523 and 525 are printed or plated and to which the jack 522 is attached. The antenna 500' is shown to have flat sides. The sides terminate a longitudinally extending edges 500" which extend transversely or laterally with respect to the longitudinal direction of the web C, that is, parallel to the line of dot heating elements of the print head 69. One of the edges 500" is adjacent to transponders T which pass along the web path through the printer 40 from the roll R to the nip between the print head 69 and the platen roll 63. The field strength is greater along the edge 500" which is adjacent the transponder T than the field strength at the flat planar sides of the antenna 500'. Also the antenna 500' and the holder 507 readily fit between the web guide 62 and the platen roll 63, as shown. The portions of the holder 507 adjacent the conductors 523 and 525 are spaced from the holder 507 as shown at 512'.

FIG. 8 illustrates diagrammatically the connections of the conductors 523 and 525 to the jack 522.

With reference to FIGS. 9 and 10, the jack 522 is shown to comprise a body 526, a pin connector or pin 527, and an insulator 528 which electrically insulates the pin connector 527 from the body 526. The pin 527 is shown to extend partially through a conductively plated-through hole 527' in the substrate 524. Solder 530' electrically connects the printed conductor 525 to the pin 527. The jack 522 also has four pins 529 (FIG. 10) formed integrally with the body 526. The pins 529 extend partially through the substrate 524 and solder 530 provides electrical and physical connection of the jack 522 to the antenna 500'.

Figure 13:
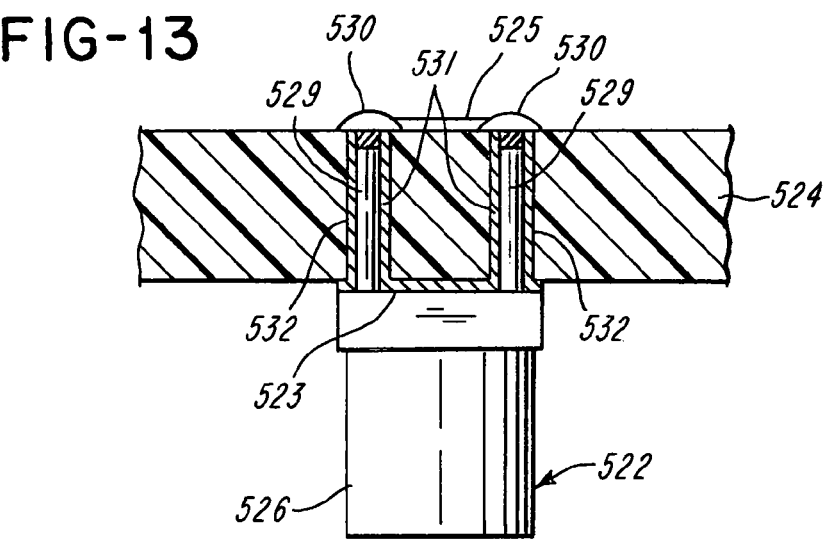
FIG. 13 is a partly sectional view taken generally along line 13-13 of FIG. 12.
Figure 14:
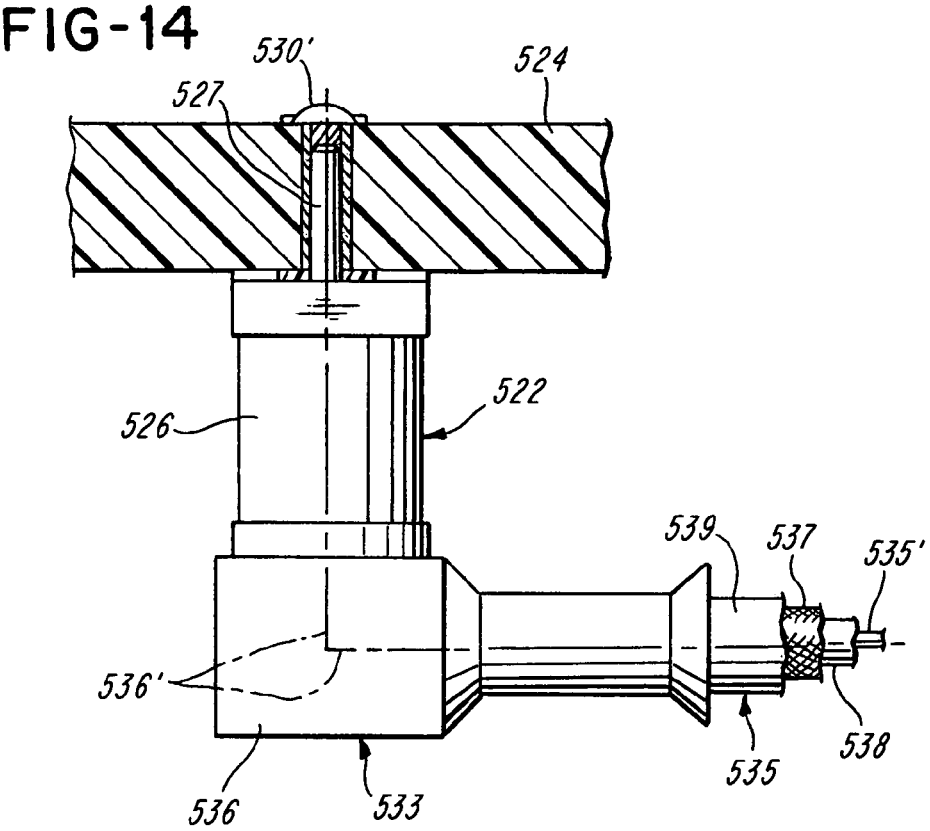
FIG. 14 is a partly sectional view taken along line 14-14 of FIG. 12.

FIG. 12 shows an enlargement of a portion of FIG. 7, rotated 90 degrees. FIG. 13 shows the manner in which two of the pins 529 of the four pins 529 are connected to the conductor 523. The pins 529 extend into conductively plated-through holes 531. Plating 532 in the holes 531 is connected to the conductor 523. Thus, the body 526 of the jack 522 is electrically connected by the solder 530 to the conductor 523 via two of the pins 524 and the respective plated-through holes 531. The pins 529 and the solder 530 mechanically hold the jack 522 to the substrate 524. FIG. 14 shows a plug generally indicated at 533 coupled to the jack 522. The plug 533 is connected to a cable 535. The plug 533 has a pin (not shown) which received in recess 534 (FIG. 9) to electrically connect the pin 527 and a conductor 535' of the cable 535 as depicted by dot-dash line 536'. The plug 533 has a body 536 which snap-connects to the body 526. A braided shielding conductor 537 is electrically connected or coupled to the body 536 and the body 536 is mechanically and electrically connected or coupled to the body 526. The conductors 535' and 537 are electrically insulated from each other by insulation 538 and an insulator 539 insulates the cable 535 from contact with other parts of the printer 40. Further details of the illustrated jack 522, plug 533 and the cable 535 are disclosed in specification pages of Johnson Components, Waseca, Minn. www.johnsoncomponents.com, entitled MMCX Straight PC Mount Jack Receptacle and MMCX-50 Ohm Connectors and in a specification page 337 Amphenol Corporation, www.amphenolrf.com entitled Assembly Instruction—C72, MMCX.

Figure 15:
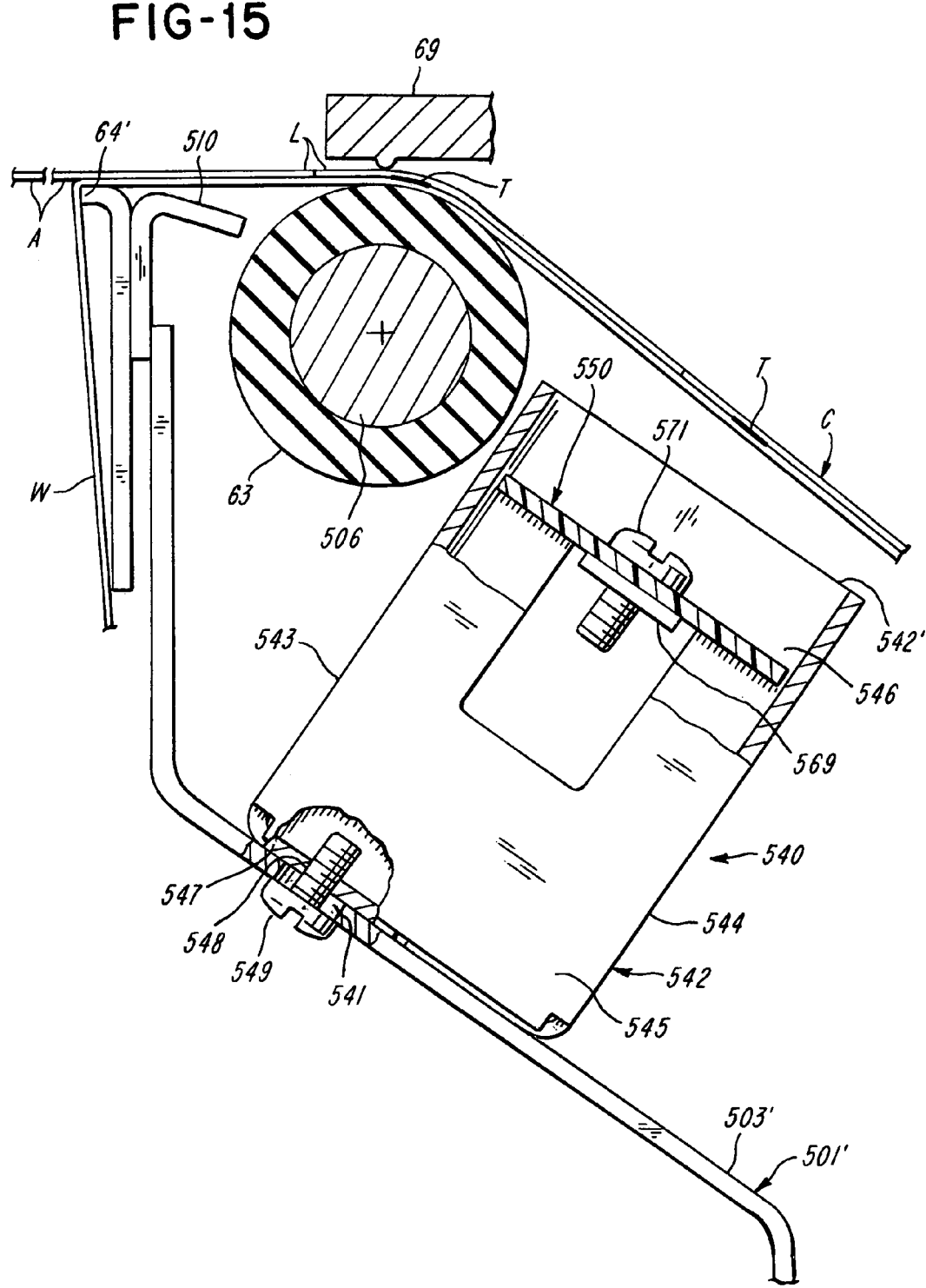
FIG. 15 is a sectional view similar to FIG. 3, but showing an alternative antenna assembly from the antenna assembly shown in FIG. 3.

With reference to FIG. 15, there is shown an alternative antenna system with an antenna assembly generally indicated at 540 disposed in the printer 40 between the web guide 62 (FIG. 1) and the platen roll 63. The antenna system the antenna assembly 540 and, if desired, may also include the conductive shield 501'. The shield 501' is identical to the shield 501, except that the shield 501' has two laterally spaced holes 541 (only one of which is shown) instead of the two slots 509. The holes 541 are aligned with threaded holes 548. The antenna assembly 540 has an electrically conductive metal enclosure or shield generally indicated at 542 having side panels or side walls 543, 544, 545 and 546 and bottom or back panels 547. While the conductive shield 542 is composed of metal, the shield 542 can be constructed of molded or fabricated non-conductive plastics material which has a conductive coating such as would be created by vacuum metalizing or plating, wherein the plating is in conductive contact with the shield 501' and antenna 550. The enclosure 542 can also be constructed of a conductive plastics material, if desired. The side panels 543 through 546 terminate at an open top 542'. The bottom panels 547 have the threaded holes 548. The panels 547 are closely spaced or they can touch each other and constitute a back wall or back panel. Screws 549 pass through respective holes 541 and are threaded into the threaded holes 548 to hold the antenna assembly 540 securely and electrically connected to the inclined portion 503' of the shield 501'. As in the first embodiment, the shield portion 503' supports the antenna assembly 540 so that a microstrip or microstrip antenna 550, discussed below, is generally parallel to the web C and the plane of the RFID transponder T. The enclosure 542 is electrically grounded to the metal printer frame through the shield 501'.

With reference to FIGS. 15, 16 and 18, the antenna assembly 540 includes the microstrip antenna 550 and the shield 542. The antenna assembly 540 is shown in FIG. 1 to be located at the write and/or read station. The shield 542 acts to direct the energy radiated from the antenna 550 to the region above opening 542'. This reduces the energy that is seen by the RFID transponders T located upstream and downstream from the RFID transponder located over or adjacent the antenna 550. The shield 542 is electrically connected to conducting elements 553, 554 and 560 by screws 571 received in through plated-through holes 557 and threaded holes 570 (FIG. 22). The elements 553 and 560 are electrically connected to each other by plated-through holes 558. The conductive elements 553, 554, 556 and 560 are formed on a non-conducting substrate 552. The driven element of the antenna 550 is the microstrip 556. The resonant frequency of the antenna 550 is mainly determined by the length of the microstrip 556. The antenna assembly 540 is mounted on the shield portion 503', with the plane of the microstrip antenna 550 being parallel to the web C. The main part of the antenna 550 is the driven element 556, the length of which is selected to be approximately a quarter wavelength of the desired resonant frequency of the antenna. The plane of the antenna 550 is shown to be generally parallel to the web C and the microstrip element 556 extends parallel to and in the same direction as the generally flat transponder T in the web C. If desired, the antenna assembly 540 can be used to write to and/or read a transponder T which is at a different orientation such as perpendicular to the element 556, as contrasted to the parallel orientation of the transponder T shown in FIG. 2. The top of the shield or enclosure 542 or the opening 542' is nominally spaced from the web C by 3.0 millimeters. The upper surface or first face of the antenna 550 is spaced 5.62 millimeters from the top of the enclosure or opening 542'. Microstrip antenna 550 parameters such as resonant frequency, bandwidth and driving point impedance can be changed by changing the length of element 556, the size and dielectric constant of the substrate 552, the width of element 556, and distance between holes 558 and 559. The beam width of the antenna assembly 540 is determined mainly by the position of the antenna 550 in the enclosure 542. Element 556 is 41.5 millimeters long and 5 millimeters wide, providing resonance at 915 MHz and broad band operation. The shield 542 also functions as a support or housing for the antenna 550. These dimensions are by way of example, not limitation.

With reference to FIG. 17, there is shown what can be described as a first face of the antenna 550, with FIG. 18 showing the second face. The antenna 550 is comprised of a printed circuit board 551 having the non-conductive substrate 552 with conductive portions or elements generally indicated at 553, 554 and 560. The conductive portions 553 and 554 preferably have peripheral edges or a boundry spaced inwardly from the side edges of the substrate 552 so they cannot contact the inside surfaces of the shield 542. The conductive portion 553 has a generally rectangular portion or element 555 with a narrow strip or driven element 556 extending from the rectangular conductive portion 555 toward but spaced from the portion 554. It is noted that the antenna of this embodiment can be formed without the conductive portion 554. The rectangular portion 555 of the portion 553 and the portion 554 have conductively plated-through holes 557, one of which is illustrated in greater detail in FIG. 22. The area 555 has four small, spaced, conductively plated-through holes 558 and the element 556 has one small, conductively plated-through hole 559, as shown in an enlarged scale in FIGS. 19 and 23. in this preferred embodiment, the hole 559 is 5.0 millimeters from the centerline of the holes 558 and the centerline of the holes 558 is 1.5 millimeters from the place where the element 556 joins the portion 555.

FIG. 18 shows that the second face is plated with a conductor 560, except for the marginal edges 561 and an area 562 best shown in FIG. 20. The conductor 560 forms a ground plane that extends substantially throughout the second face of the substrate 552, underlying the strip 556. This ground plane contributes to the directivity of the energy radiated from the strip 556 toward the transponder T. The conductor-free marginal edge 561 prevents the conductor 560 from contacting the inside surfaces of the shield 542. By spacing the elements 554, 555 and 560 from the enclosure 542, it assures that the only electrical connection of the antenna 550 to the enclosure 542 is through the screws 571. This assures that the characteristics of the antenna 540 are not affected by contact of elements 553, 554 and/or 560 with the conductive enclosure 542 at one or more other locations. A conductive area generally indicated at 563 is completely surrounded by conductor-free area 562. The conductive area or conductor 563 has a generally circular conductive portion 564 joined by a conductive bridge 566 to a generally circular conductive portion 565 which surrounds the plated-through hole 559. It is apparent that the conductive portion 565 is electrically connected to the microstrip element 556 through the plated-through hole 559 as best shown in FIG. 23.

With reference to FIGS. 21 and 25 through 26, the shield or enclosure 542 is shown to be comprised of a single piece of conductive metal such as aluminum bent into the shape illustrated. With reference to FIG. 16, the panel 544 has a bent end portion 567 which overlaps the outside of the panel 546. The panel 544 has a hole 544' through which the cable 05 passes. The spaced bottom panels 547 are joined to the side panels 543 and 544 at bends 568. Bent-in tabs 569 have threaded holes 570. The antenna 550 is supported by the tabs 569. As best shown in FIG. 22, one of the screws 571 extends through a star washer 572 and the plated-through hole 557 and is threaded into the hole 570 in the tab 569. The screws 571 insure that the conductive portions 554, 555 and 560 make good electrical contact with the tabs 569 which are part of the shield 542.

With reference to FIGS. 23 and 24, there is shown a jack generally indicated at 573 and a plug 574 connected thereto, however, FIG. 24 shows only the end of the jack 573. The jack 573 is of the surface-mount type and has four short square pins or feet 575 and has a short central pin 576 electrically isolated from body 577 and the pins 575 of the jack 573. Further details of the jack 573 and the plug as disclosed in specification sheets of Johnson Components, Waseca, Minn. entitled "MMCX-50 Ohm Connectors" and MMCX Straight Jack Receptacle, Surface Mount. The pin 576 of the plug 574 is connected to a conductor 577' of the cable 577 as shown by dot-dash line 578. The conductor 577' is electrically insulated from a braided shielding conductor 579 by insulation 580. The cable 577 is electrically insulated from contact with other printer parts by an insulator 581. The conductor 579, the body 582 of the plug 574, the body 577 of the jack 573, and the pins 573 are all connected electrically, and the plug 574 and the jack 573 are mechanically snap-connected.

The four pins 575 of the jack 573 are soldered to the copper-plated conductor 560, and the pin 576 is soldered to the circular portion 564 of the conductor 563. With reference to FIG. 20, the position of the four pins 575 is shown by phantom line squares 575P. A circuit path exists between the pin 576 and the conductor portion 556 through the conductor 563 and the plated hole 559.

Figure 27:
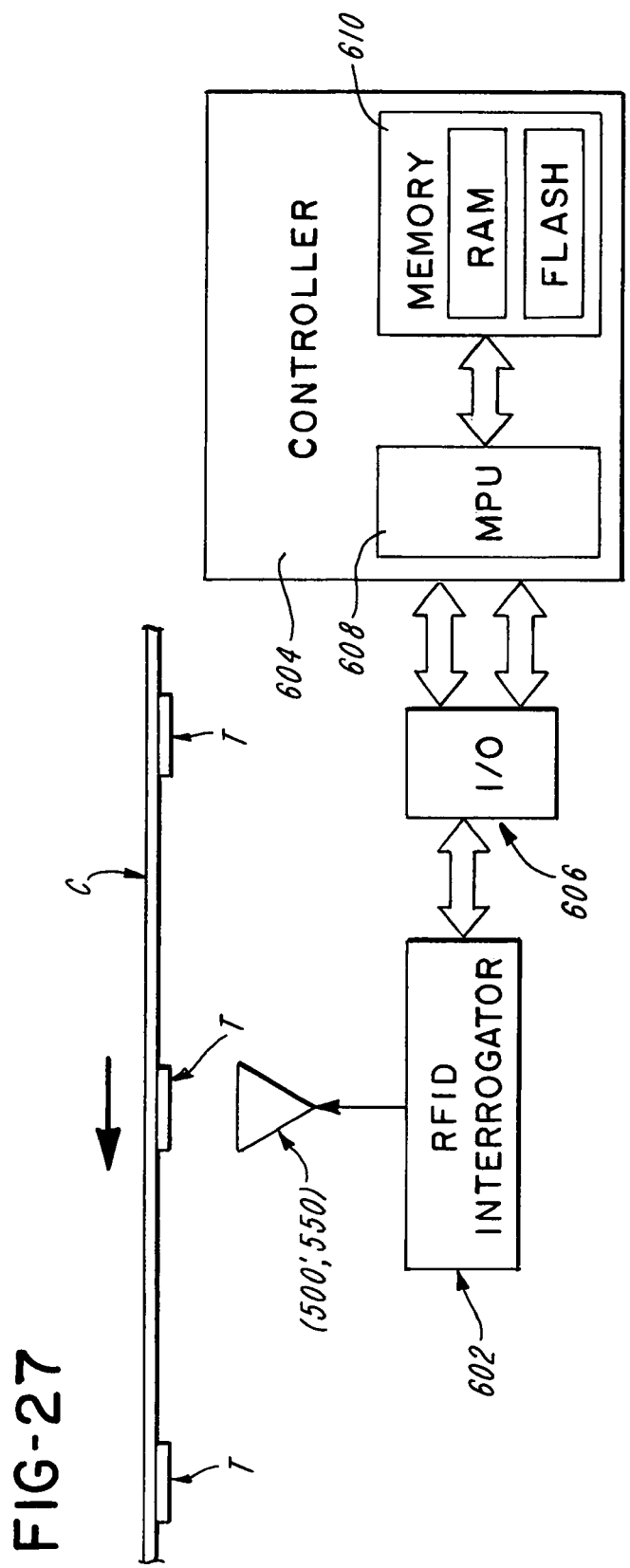
FIG. 27 is a block diagram of an RFID read/write station in the RFID printer of FIG. 1.
Figure 30A:
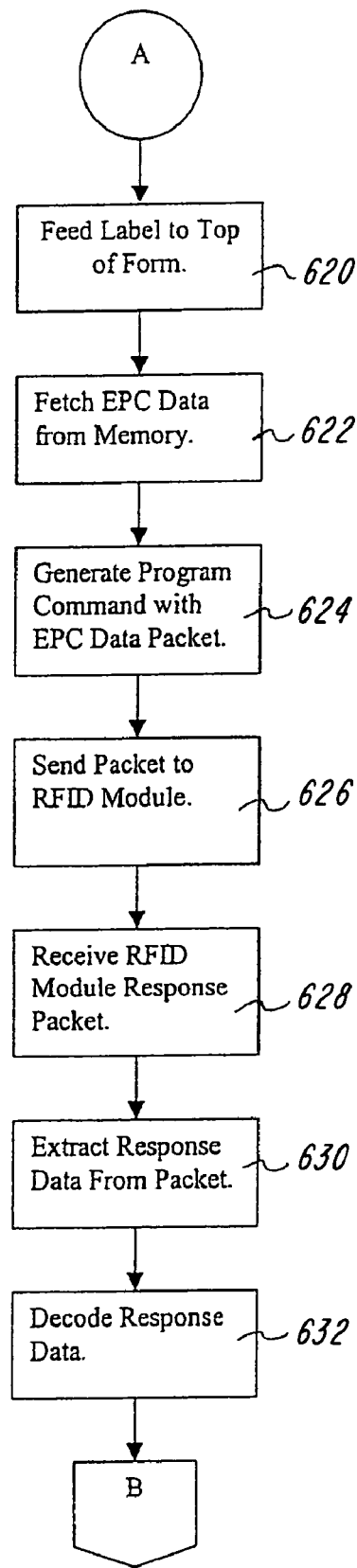

The block diagram of FIG. 27 and the flowchart of FIGS. 30A and 30B illustrate the RFID portion of the printer in FIG. 1 for both antenna embodiments, namely, the antenna assemblies 500 and 540, for example, wherein the RFID antenna 550, for example, radiates energy in a narrow beam towards an adjacent RFID transponder T, that is aligned with the antenna 550. The RFID antenna 550 radiates energy in response to an RFID module or interrogator 602 in order to write to or program the adjacent RFID transponder. The RFID interrogator 602 is responsive to a controller 604 to drive the antenna 550 to write or program particular information into the adjacent RFID transponder T and the interrogator 602 is responsive to energy picked up by the antenna 550 from the RFID transponder T to read information stored on the transponder T. The RFID interrogator 602 is coupled to the controller 604 by an RFID input/output interface 606, the interrogator 602 receiving or sending communication signals through the interface 606 and the interrogator 602 receiving power via the interface 606. The controller 604 includes a microprocessor 608 and memory 610. The memory 610 may include a RAM for storing data and an application program and a flash EEPROM for storing software controlling the printer 40.

Figure 28:
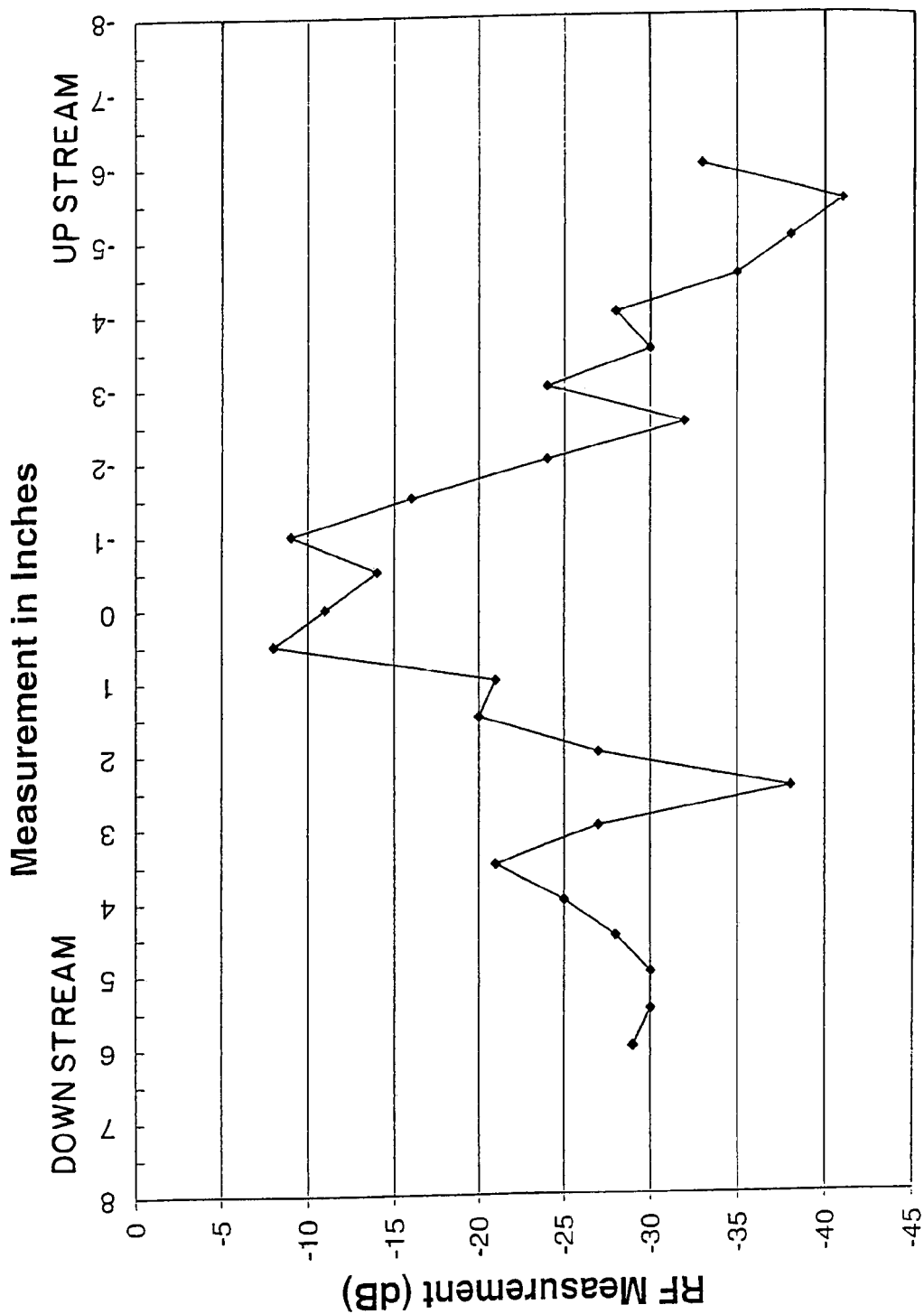
FIG. 28 is a graph of the response curve using the antenna system of the embodiment of FIGS. 1 and 3 through 14.

FIG. 28 is a graph illustrating the field strength radiated from the antenna 500' mounted in the printer 40 as a function of the distance upstream and downstream from the antenna 500' in the web path. The 0.0 point on the graph represents the position of an RFID transponder T aligned with the antenna 500'. As can be seen, the field strength of the antenna 500' is highest near the between about 1.0 inch upstream to about 0.5 inch downstream. The field strength drops off sharply as one moves upstream or downstream. As is apparent, the antenna 500' can write to and/or read an RFID transponder at far less than a pitch or record member length of six inches, namely, a record member of two inches can be written to and/or read without affecting or being affected by an RFID transponder that is upstream or downstream of the adjacent transponder.

Figure 29:
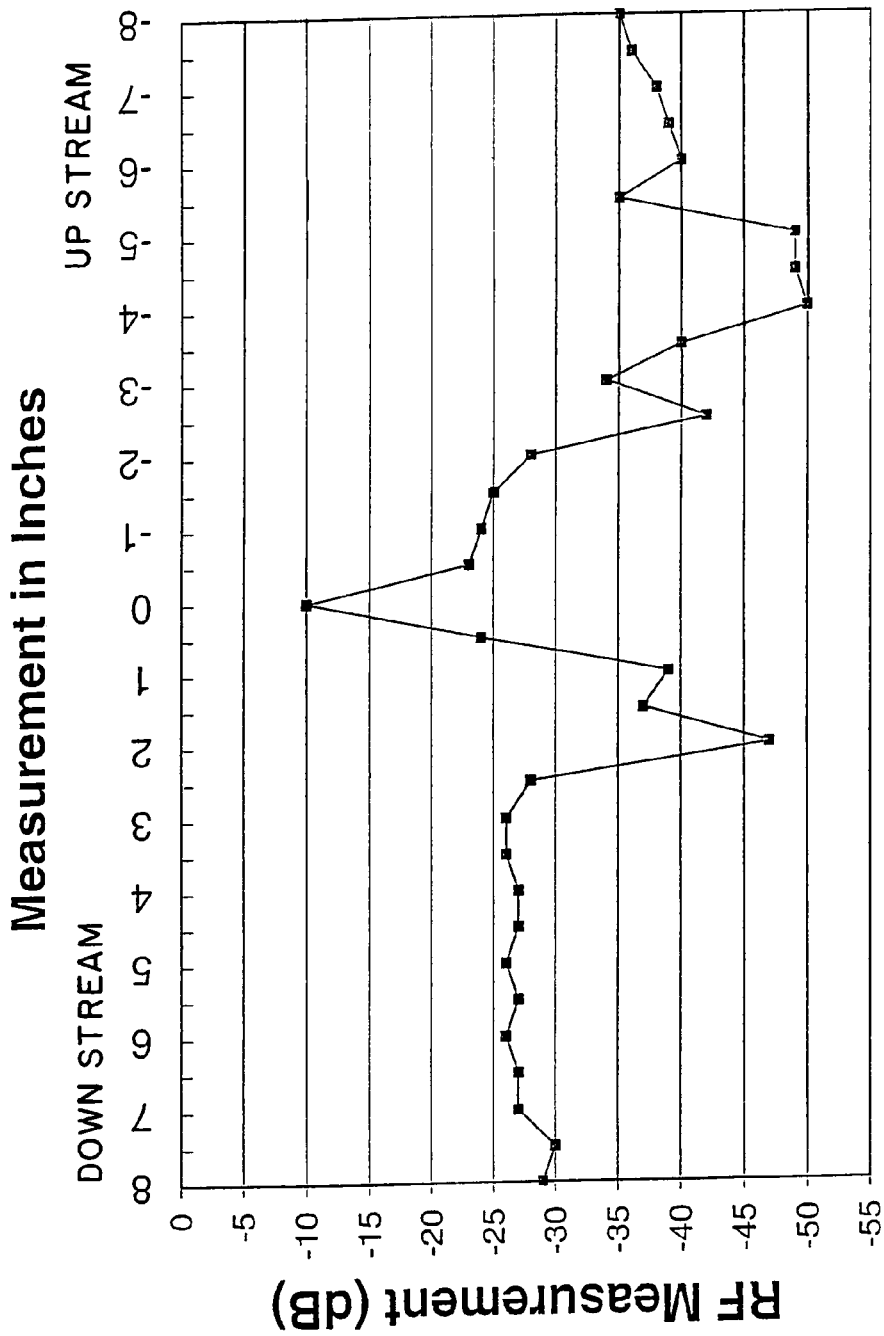
FIG. 29 is a graph of the response curve using the antenna system of the embodiment of FIGS. 15 through 27.

FIG. 29 is a graph illustrating the field strength of the energy radiated from the antenna 550 mounted in the printer 40 as a function of distance upstream and downstream from the antenna 550 in the web path. The 0.0 point on the graph represents the position of an RFID transponder T aligned with the antenna 550. As can be seen, the field strength of the antenna 550 is the highest at the 0.0 position, directly above the antenna 550. The field strength drops off sharply as one moves upstream or downstream from the 0.0 antenna position. As such, the antenna 550 is highly directional. Because the antenna 550 is highly directional, it can write to or program and read from the aligned RFID transponder T, i.e. a transponder at the 0.0 position, without affecting or being affected by an RFID transponder that is upstream or downstream of the aligned transponder T. As seen from the graph of FIG. 29, the antenna 550 is suitable for use with webs where the RFID transponders in adjacent labels are separated by two inches or less, for example one inch, i.e. for RFID label lengths as short as two inches or less, for example one inch in length. It should be apparent, that the antenna 550 is also suitable for webs having the RFID transponders separated by a distance greater than 2.0 inches and for labels greater in length than 2.0 inches, as well.

The microprocessor 608 (FIG. 27) controls the printer 40 of the embodiments of the present invention to write to and/or read an RFID transponder T in a label and to print on that same label as follows with respect to FIGS. 30A-B. At a block 620, the microprocessor 608 controls the printer motor to feed a label to the top of form position at which point the movement of the label web is stopped. At the label top of form position, the RFID transponder T will be generally aligned with the antenna 550. At block 622, the microprocessor 608 retrieves data from the memory 610 that has been sent from the host for writing to the RFID transponder. This data may be for example electronic product code (EPC) information or other data. Thereafter, at block 624, the microprocessor 608 generates a program command. The program command is a packet of control information to be sent to the RFID interrogator or module 602. From block 624, the microprocessor 608 proceeds to block 626 to send the generated packet to the RFID module i.e. interrogator 602.

It is noted that in a preferred embodiment, the RFID module or interrogator 602 includes its own microprocessor. The RFID module performs a number of functions. For example, the module 602 determines whether an RFID transponder is within its field by reading the RFID transponder's identification code. The RFID module 602 as instructed by the controller 604 erases the data stored in the RFID transponder, verifies the erasure and then programs the RFID data received from the microprocessor 608 into the RFID transponder. The RFID module 602 also verifies that the data has been programmed into the RFID transponder by reading the data stored in the transponder after a programming operation to verify that the data was correctly written into the RFID transponder. Upon completing the verification process, the RFID module generates a response packet that is transmitted back to the microprocessor 608.

The microprocessor 608, at block 628, receives the response packet from the RFID module 602 and at block 630, the microprocessor 608 extracts data from the response packet. The data in the response packet may include a code representing the successful programming of the RFID transponder or the data may include a code representing a particular error. For example, the response data may include an error code indicating that the RFID module could not read an RFID tag, or a code indicating that the tag could not be erased or a code indicating that the tag was not accurately programmed. At block 632, the microprocessor 608 decodes the data in the response packet to determine at block 634 whether the programming of the RFID transponder was successful or whether the response packet from the RFID module included an error code. If the programming of the RFID transponder was determined to be successful, that is, without error, at block 634, the microprocessor 608 proceeds to block 636 to control the feeding or movement of the web and the printing of data on the label via the print head. It is noted, that while the RFID transponder is being read from or programmed, the web is stationary. However, during the printing of information on a record member at block 636, the microprocessor 608 moves the web past the print head during the printing operation. If the microprocessor 608 determines at block 634 that the response packet received from the RFID module indicated an error condition, the microprocessor 608 proceeds to block 638 to display an error message on a liquid crystal display of the printer. From block 638, the microprocessor proceeds to block 640 to feed the label with the defective RFID transponder past the print head and controls the print head to print an overstrike image, such as evenly spaced longitudinally extending bars, on the record member RM. This indicates that the RFID transponder is defective. From blocks 638 or 640, the microprocessor proceeds to block 608 to feed the next label to the top of form position at block 620 as discussed above.

While the block diagram of FIG. 27 and the flow chart of FIGS. 30A and 30B and the corresponding parts of the specification, show and describe the invention as related to the embodiment of FIGS. 1 and 15 through 26, they relate as well to the embodiment of FIGS. 1 and 3 through 14.

As used herein, the expression "conductive" is intended to mean "electrically conductive".

While the antenna assembly 540 is described in connection with a stational or tabletop printer 40, the antenna assembly 540 is usable in portable and/or hand-held devices as well. The antenna assembly 540 can be positioned at the front end of a battery-powered, trigger-activated housing with a manually graspable handle as depicted at 100 in U.S. Pat. No. 6,677,852.

By way of further example, not limitation, the substrate 552 is 18 millimeters in width, 95 millimeters in length and 1.57 millimeters in thickness; the enclosure or shield 542 is 104 millimeters in length from the outside of the wall 545 to the outside of the wall 546, 20.7 millimeters in width from the outside of the wall 543 to the outside of the wall 544, and 34 millimeters in height from the outside of the wall provided by panels 547 and the opening 542'; the thickness of bent sheet metal that comprises the panels 543, 544 545, 546, and 547 is 1.2 millimeters; the distance from the web guide 60 and the platen roll 63, namely the space available for the antenna assembly 500 or the antenna assembly 540 is about 24.65 millimeters; and the distance from the microstrip element 556 to the inside surface of the bottom panels 547 is 27.18 millimeters. The distance from the nip between the print head 69 and the platen roll 63 to terminal end 510' of the guide 510 (FIG. 3) is 8 millimeters.

Many modifications and variations of the present invention are possible in light of the above teachings. Thus, it is to be understood that, within the scope of the appended claims, the invention may be practiced otherwise than as described hereinabove.

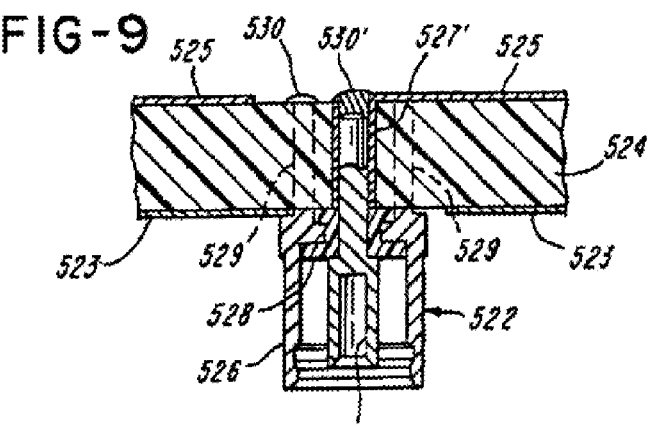
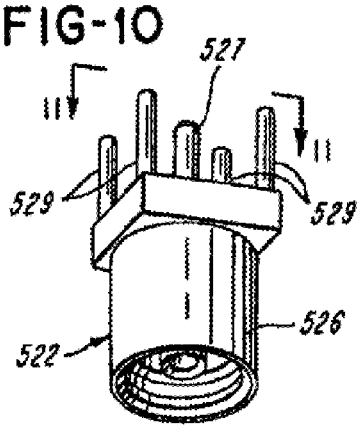
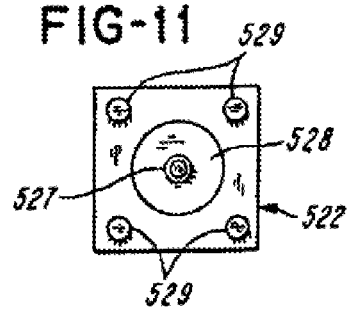
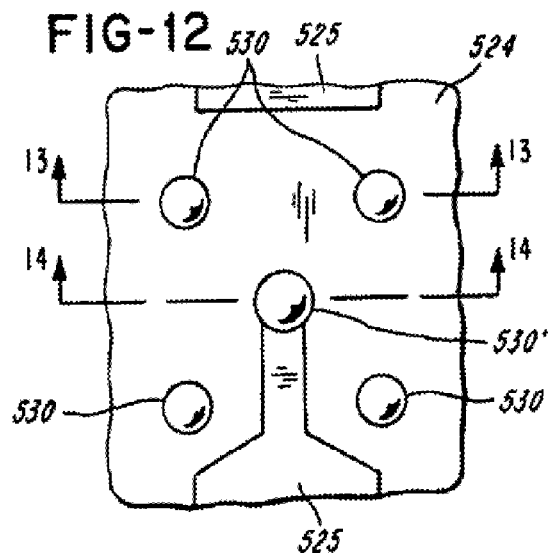

What is claimed is:

1. A printer for printing on a longitudinally extending web of record members having RFID transponders disposed at spaced locations along the length of the web, the printer comprising:
a print head capable of printing on the web,
a web path for the web extending in a downstream direction to the print head,
a write and/or read loop antenna disposed along the web path upstream of the print head, the antenna having opposite sides, wherein one side of the antenna faces in the upstream direction and the other side of the antenna faces in the downstream direction, the antenna having a conductor arranged in a loop, one loop portion of the conductor of the loop antenna being disposed adjacent the web path and another loop antenna portion of the conductor being disposed away from the web path, wherein the antenna writes to only the transponder adjacent the one loop portion without affecting any transponder upstream or downstream of the adjacent transponder.

2. A printer as defined in claim 1, wherein the loop antenna is generally flat and comprises a substrate having the conductor thereon.

3. A printer as defined in claim 1, wherein the loop antenna includes a substrate having generally flat opposite sides, wherein the loop antenna further includes a loop conductor on each side of the substrate.

4. A printer as defined in claim 3, including a connector connected to each loop conductor.

5. A printer as defined in claim 4, including a holder for the substrate, and wherein the connector is received in a slot in the holder.

6. A printer as defined in claim 5, wherein the holder is non-conductive.

7. A printer as defined in claim 4, wherein the holder has a slot and wherein the antenna is received in the slot.

8. A printer as defined in claim 1, including a holder having an open-ended slot to slidably receive the antenna.

9. A printer as defined in claim 1, wherein the one loop portion is disposed between the web path and the other loop portion.

10. A printer as defined in claim 1, wherein the antenna has more than one loop.

11. A printer as defined in claim 10, wherein the antenna has two loops.

* * * * *

UNITED STATES PATENT AND TRADEMARK OFFICE
CERTIFICATE OF CORRECTION

PATENT NO.         : 7,439,861 B2
APPLICATION NO. : 11/789109
DATED                : October 21, 2008
INVENTOR(S)       : John F. Feltz It is certified that error appears in the above-identified patent and that said Letters Patent is hereby corrected as shown below:

On the title page item [75] delete -- Jim A. McCurdy, Liberty Towship, OH (US); Lance D. Neuhard, New Carlisle, OH (US) -- as Inventors In the drawings, remove sheet 5 of 15 and replace with formal drawing of sheet 5 of 15 (attached).

Signed and Sealed this

Twentieth Day of January, 2009

JON W. DUDAS
*Director of the United States Patent and Trademark Office*